Sept. 15, 1931.   M. J. CUNNINGHAM   1,823,132
ROTARY INTERNAL COMBUSTION ENGINE
Filed June 8, 1927   3 Sheets-Sheet 1
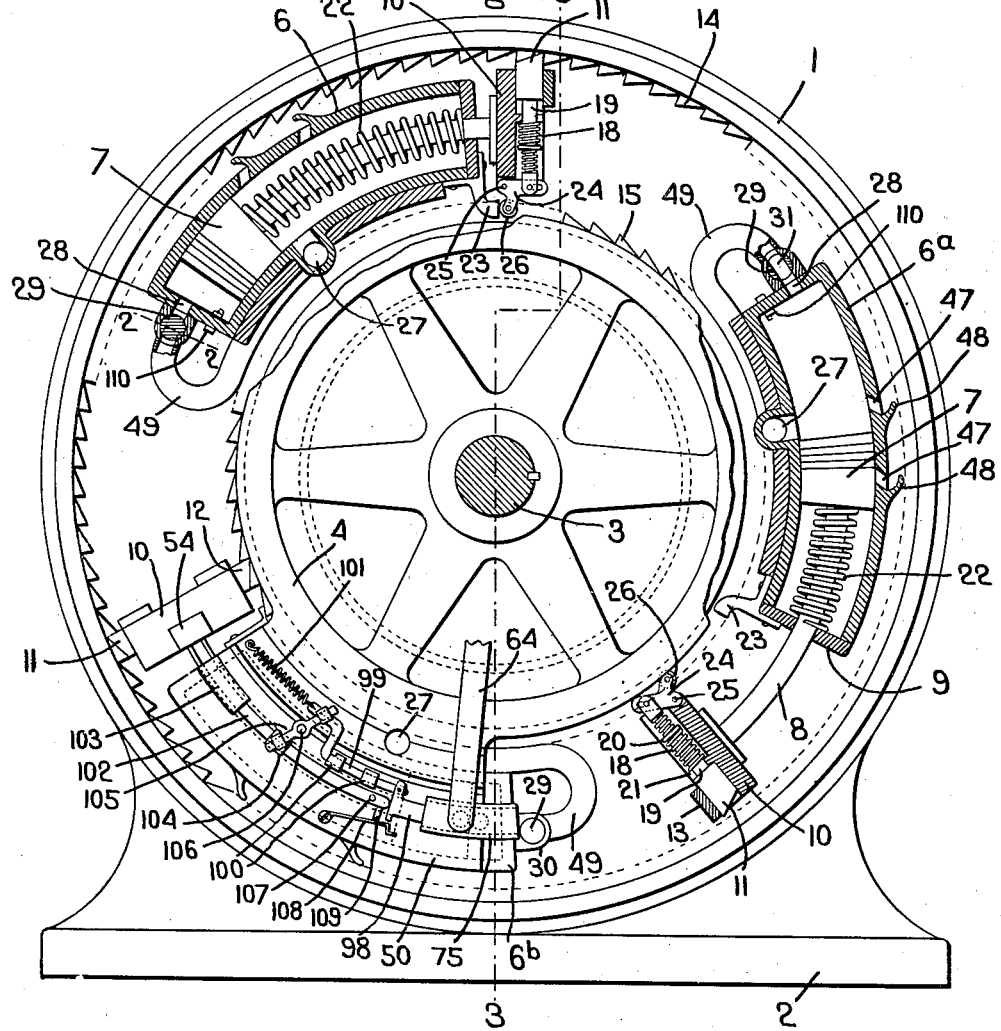
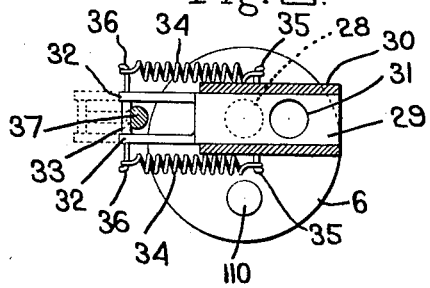
Inventor.
Michael J. Cunningham
by Heard Smith & Tennant.
Attys.

Sept. 15, 1931.   M. J. CUNNINGHAM   1,823,132
ROTARY INTERNAL COMBUSTION ENGINE
Filed June 8, 1927    3 Sheets-Sheet 2
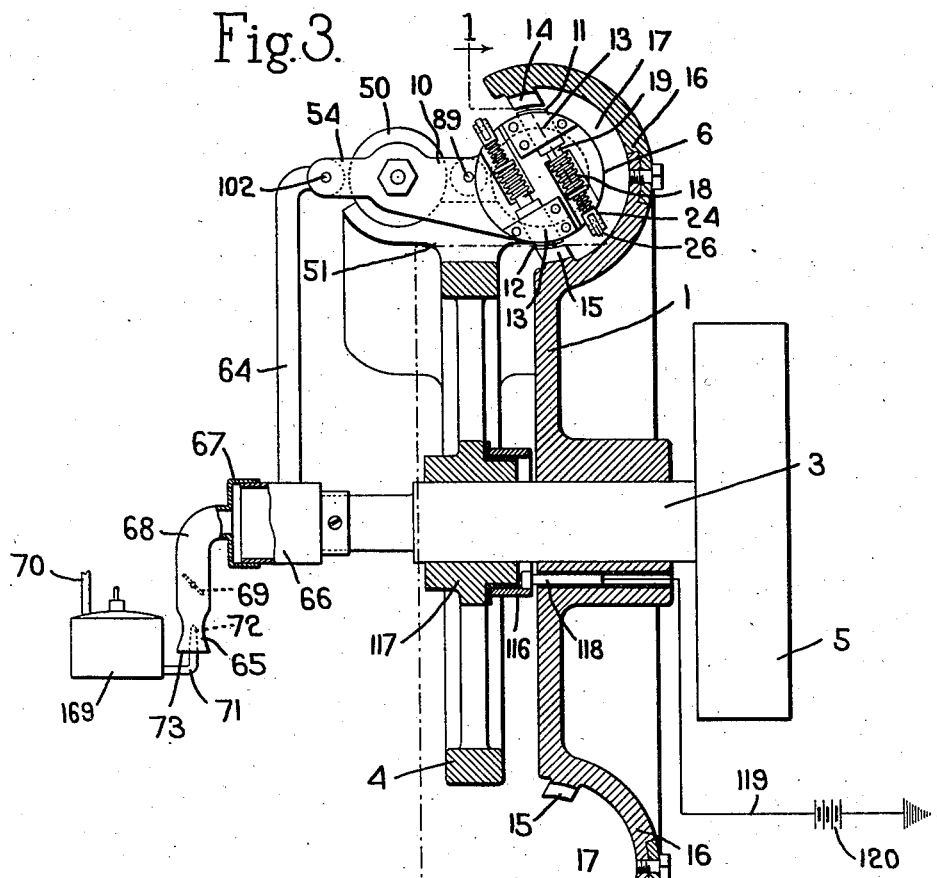
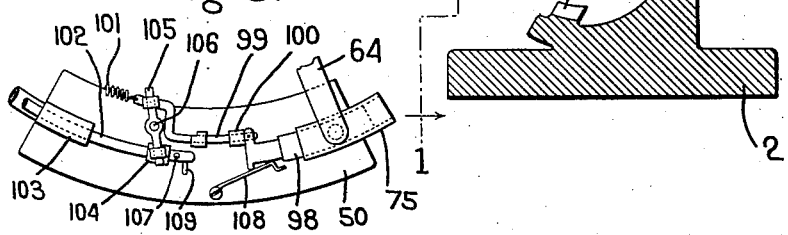
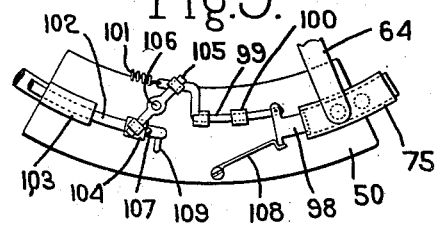
Inventor.
Michael J. Cunningham
by Heard Smith & Tennant.
Attys.

Sept. 15, 1931. M. J. CUNNINGHAM 1,823,132
ROTARY INTERNAL COMBUSTION ENGINE
Filed June 8, 1927 3 Sheets-Sheet 3
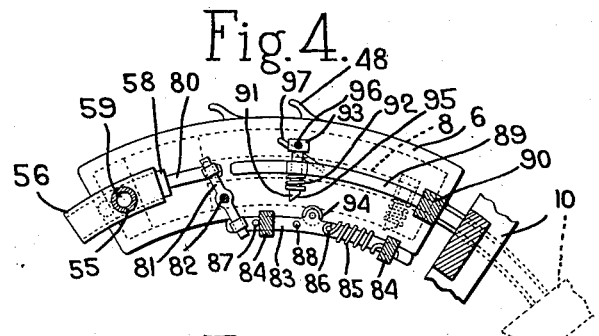
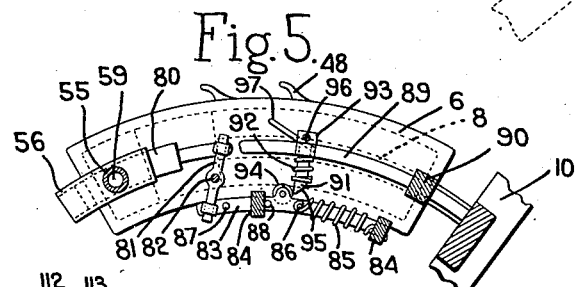
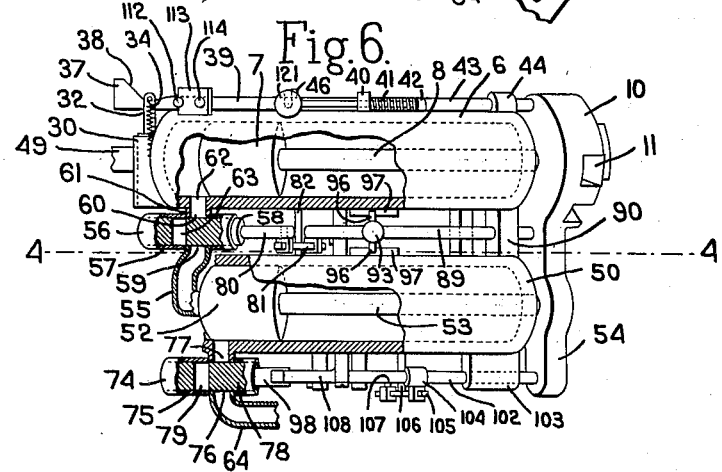
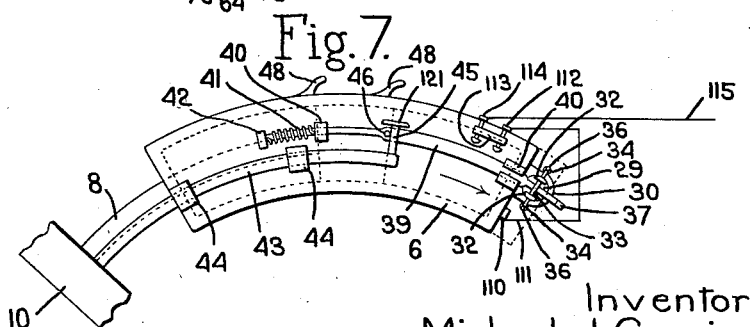
Inventor.
Michael J. Cunningham
by Heard Smith & Tennant.
Attys.

Patented Sept. 15, 1931

1,823,132

UNITED STATES PATENT OFFICE

MICHAEL J. CUNNINGHAM, OF ROXBURY, MASSACHUSETTS

ROTARY INTERNAL COMBUSTION ENGINE

Application filed June 8, 1927. Serial No. 197,439.

This invention relates to rotary internal combustion engines of that type in which the cylinder of the engine is mounted on a rotor and the piston is anchored to a stationary part during the power stroke so that the pressure developed in the cylinder will drive the cylinder and rotor forward.

One of the objects of the invention is to provide a novel multi-cylinder rotary internal engine of this type in which the cylinders operate independently of each other.

Another object of the invention is to provide a rotary internal combustion engine of this type which operates on the two cycle principle so that there is a power impulse for each stroke of each piston.

Other objects of the invention are to improve generally rotary internal combustion engines in various particulars as will be more fully hereinafter set forth.

In order to give an understanding of the invention I have illustrated in the drawings a selected embodiment thereof which will now be described after which the novel features will be pointed out in the appended claims.

Fig. 1 is a view taken on substantially the line 1—1, Fig. 3 showing an engine embodying my invention;

Fig. 2 is an enlarged section on the line 2—2, Fig. 1;

Fig. 3 is a section on the line 3—3, Fig. 1;

Figs. 4 and 5 are sections taken on substantially the line 4—4, Fig. 6 showing the inlet valve in different positions;

Fig. 6 is a plan view of one power unit separated from the rotor;

Fig. 7 is a side view of Fig. 6 looking from the upper side;

Figs. 8 and 9 are detail views showing the means for operating the valve 74.

My improved engine comprises a main supporting frame 1 which is formed with a base 2 adapted to rest on a floor or other support. This frame 1 has journalled therein the driving shaft 3 to which is fast the rotor 4 carrying the power cylinders. The driving shaft 3 is provided with a belt pulley 5 from which power may be taken. The rotor 4 may support any desired number of power cylinders, there being three power cylinders in the illustrated embodiment of my invention. These power cylinders are indicated at 6, 6a and 6b and each is provided with a piston 7 which reciprocates therein. The cylinders are preferably curved longitudinally to correspond to the curvature of the rotor and the piston is, of course, correspondingly shaped.

At the time of the explosion in each cylinder the corresponding piston is anchored to the stationary casing 1 with the result that the explosive force drives the cylinder forward and thus gives a forward impulse to the rotor 4 and shaft 3. Upon completion of the power stroke the piston is disconnected from the stationary casing 1 and is given its return stroke by means of a spring. During this return stroke the burnt gases are exhausted from the cylinder and a fresh charge of explosive mixture is admitted and upon the completion of the return stroke the fresh charge is ignited and the piston is again anchored to the stationary casing 1 so that the force of the explosion will drive the cylinder forward again.

Each of the power pistons 6, 6a, 6b operate independently of each other in the manner above described, and each is, therefore, giving a series of forward impulses to the rotor. Each power piston 7 is provided with a curved piston rod 8 which extends out through the rear end 9 of the cylinder and is connected to a head 10, there being one such head for each cylinder 6, 6a, 6b.

Each piston is acted on by a return spring 22 which is situated between the piston and the end 9 of the cylinder, the function of the spring being to give the piston its return stroke at the end of the power stroke.

Each piston is locked or anchored to the stationary casing 1 at the time of the explosion by means of pawls carried by the head 10 which are adapted to engage ratchet teeth carried by the casing 1, the engagement of the pawls with the ratchet teeth preventing backward movement of the piston and thus causing the cylinder to move forward under the force of the explosion.

In the present embodiment of the invention there are two such pawls on each head 10, these pawls being indicated at 11 and 100

12 respectively. These pawls are carried in suitable guides 13 formed on the head and are adapted to co-operate with ratchet teeth 14, 15 rigidly carried by the casing 1. It will be noted that the peripheral portion 16 of the casing has a semi-circular shape and thus provides an annular space 17 which partially receives the power pistons 6, 6a, 6b and in which said pistons travel. The ratchet teeth 14 and 15 are formed on the inner wall of this semi-circular portion 16.

The pawls 11, 12 are normally held in retracted position shown in Fig. 3 and at the lower right hand portion of Fig. 1 through the medium of springs 18. Each pawl is provided with a shank 19 having a collar 20 thereon and the spring 18 is confined between the collar 20 and a shoulder 21 formed on the head 10.

The piston 7 and cylinder 6 at the upper left hand portion of Fig. 1 are shown in the relative position they occupy when the piston 7 has completed its return stroke while the cylinder 6a and its piston at the right of Fig. 1 are in position they occupy at the end of the power stroke.

Since each cylinder operates on the two-cycle principle there will be an explosion in the cylinder at the end of each return stroke or when the parts are in the position shown at the upper left hand part of Fig. 1. At this time the pawls 11 and 12 are thrown outwardly into engagement with the ratchet teeth 14 and 15 as shown at the left hand upper portion of Fig. 1 and while the ratchet pawls are thus in engagement with the ratchet teeth the corresponding head 10 will be prevented from backward movement. Consequently the force of the explosion in the cylinder will drive the rotor forward. The return stroke of each piston 7 is secured through the medium of a return spring 22 which surrounds the piston rod 8 and is confined between the piston and the end of the cylinder. This spring is compressed during the power stroke and its expansive force gives the piston its return movement.

For throwing the pawls 11, 12 into their operative position the end of each power cylinder is provided with two dogs or bunters 23, one for each pawl, and each head 10 has two bell crank levers 24, one for each pawl, pivoted thereto at 25, one arm of each lever having a pin-and-slot pivotal connection with the stem 19 of the corresponding pawl. The other arm of each elbow lever carries a roll 26 which is adapted to be engaged by the bunter 23 just as the piston 7 completes its return stroke under the influence of the return spring 22. The engagement of the bunter with the roll 26 will rock the lever 24 and thus move the corresponding pawl 11, 12 outwardly into engagement with its ratchet teeth. This outward movement of the pawl compresses the spring 18. As explosion occurs and the cylinder moves forwardly the pressure of the pawls against the face of their ratchet teeth will suffice to hold the pawls in operative engagement with the ratchet teeth during the power stroke notwithstanding the fact that the forward movement of the cylinder has removed the bunter 23 from engagement with the roll 26. When the power stroke is completed and the pressure of the pawls 11, 12 against the face of the ratchet teeth is relieved the springs 18 will retract the pawls as shown at the lower right hand portion of Fig. 1. During the power stroke the spring 22 is compressed and its resiliency serves to return the piston 7 to its forward position after the exhaust occurs.

Each cylinder 6 is provided with an exhaust port 27 which is opened and closed by the piston 7. Said exhaust port is situated so that it will be opened at the end of the power stroke at the right hand portion of Fig. 1, thus permitting the burnt gases to exhaust. Each cylinder is also provided with an exhaust port 28 in its forward end which is controlled by a valve 29. Said valve is normally closed during the power stroke and is opened momentarily at the end of the power stroke so that at this time the burnt gases may exhaust from the forward end of the cylinder as well as through the main exhaust port 27.

The valve 29 is shown in Fig. 2 and it is in the form of a sliding plug valve operating in an open-ended cylindrical valve casing 30, said valve having a port 31 which is adapted to be brought into alignment with the port 28 when the valve plug moves to the left Fig. 2. This valve plug has two arms 32 connected by a bridge piece 33 and the valve is normally held closed by two springs 34 which are attached at one end to the valve casing 30 as shown at 35 and at the other end to two projections 36 extending from the arms 32. The valve is opened at the proper time by a cam actuator 37 which is received between the arms 32 and is provided with a cam surface 38 adapted to engage the bridge piece 33. This cam actuator is controlled as to its operation by the piston 7.

When the parts are in the position shown in Fig. 6 the valve 29 is closed but when the cam actuator is moved to the right Fig. 6 the cam surface 38 will engage the bridge 33 and will move the valve 29 into the dotted line position Fig. 2 thus opening the valve by bringing the port 31 into alignment with the port 28.

The means for operating the valve actuator is best seen in Fig. 7. Said valve actuator is provided with a stem 39 which is slidably mounted in guides 40 carried by the cylinder 6 and said stem is acted on by a pulling spring 41 which encircles the end of the stem and is connected at one end to one of the bearings 40 and at the other end to a collar 42 on the stem, said spring normally holding the parts in rearward position shown in Figs. 6 and 7.

The head 10 has secured thereto a curved rod 43 which extends through and is guided by bearings 44 mounted on the cylinder 6. The end of the rod 43 is provided with a lateral projection or pin 45 adapted to co-operate with a pin 46 extending from the stem 39. The two pins 45 and 46 are so disposed relative to each other that just before the piston reaches the end of its power stroke and just as the exhaust port 27 is being opened by the piston said pin 45 will engage the pin 46 and during the final portion of the power stroke while the cylinder is moving into the dotted line position Fig. 7, which indicates the end of the power stroke, the engagement of the pins 45, 46 prevents further forward movement of the valve actuator so that the valve actuator has a rearward movement relative to the cylinder 6. During this rearward movement the cam face 38 acts on the bridge 33 and shifts the valve 29 into open position so that at the end of the power stroke both the exhaust ports 27, 28 are open as shown at the right hand Fig. 1. As soon as the piston 7 begins its return stroke under the influence of the compressed spring 22 the spring 41 will return the valve actuator 37 to its normal position shown in Fig. 6 thus allowing the springs 34 to close the exhaust valve 29. Each cylinder 6 is provided with one or more ports 47 and with a web or fin 48 immediately back of the port. The purpose of these ports 47, is to assist in scavenging the cylinder.

During the rotation of the rotor the vanes or fins 48 catch the air and when the port 47 has been uncovered by the piston during the power stroke the air which is caught by the fins 48 will be forced through the ports 47. This occurs at the time the exhaust ports are open so that the fresh air entering the cylinder while the exhaust ports are open will tend to scavenge the latter.

The exhaust port 27 leads directly to the atmosphere and the exhaust port 28 is connected by an exhaust pipe 49 to the exhaust port 27 so that the two will exhaust at the same point.

Each power cylinder 6 is supplied with charges of fuel by means of a charging cylinder. Each charging cylinder has a piston therein and acts as a pump, the movement of the piston in one direction of the cylinder drawing a supply of combustible mixture or fuel charge into said charging cylinder from the carbureter and the movement of the piston in the other direction forcing said charge into the power cylinder.

The charging cylinders are indicated at 50, there being one for each power cylinder as above described. These charging cylinders are curved longitudinally and lie parallel to the power cylinders and are rigidly secured to the rotor 4. The rotor is shown as having cradles or supporting portions 51 at its periphery, each cradle having seats to receive a power cylinder and a charging cylinder. Each charging cylinder has a piston 52 therein which is provided with a piston rod 53 that extends through the rear end of the cylinder and is connected to an extension 54 of the head 10. Therefore, the pistons 7 and 52 for each power unit move in unison and are rigid relative to each other. During each power stroke when the cylinders 6 and 50 are moving forward the piston 52 will be moved backwardly relative to the cylinder 50 thus producing suction in the front end of the cylinder, this suction operating to draw a charge of combustible fluid into the cylinder. During the return stroke of the piston 7 and the head 10 the piston 52 will be moved forwardly in the cylinder 50 and during this forward movement said charge is forced into the cylinder 6.

Each power cylinder 6 is connected to its charging cylinder 50 through a pipe connection 55 which has a valve 56 therein. This valve is shown in section in Fig. 6 and it comprises a cylindrical valve casing 57 open at both ends and a plug valve 58 slidably mounted therein. The valve casing 56 is provided with two oppositely disposed ports 59 and 60, the port 59 communicating with the pipe connection 55 and the port 60 communicating through a nipple 61 to an inlet port 62 of the cylinder 6. The valve plug 58 is provided with a port 63 which may be moved into register with the ports 59 and 60 to open communication between the charging cylinder and the power cylinder or may be moved out of register with said ports as shown in Fig. 8 to close such communication. The means for operating this valve will be presently described.

Each charging cylinder is connected by a pipe connection 64 with a carbureter 65. The carbureter is stationarily mounted and as the pipe connections 64 are rotating with the cylinders and rotor I have provided a special construction which permits such rotation without interfering with the flow of fuel vapor to the charging cylinders. Each pipe 64 is arranged radially and leads into a manifold 66 carried on the end of the shaft 3. This manifold is in the form of a cylindrical hollow body open at one end and the open end fits and rotates within a stationary cap 67 which forms a closure for said end. The cap is stationarily mounted and has extending therefrom an intake manifold 68 leading to the carbureter. This manifold is shown as having a throttle valve 69 therein.

The carbureter may be of any approved type. It is herein shown as comprising a float chamber 169 of usual construction which may be supplied with gasoline through an inlet pipe 70. Said chamber has extending therefrom a jet pipe 71, the end of which is bent upwardly to form a jet 72 that enters the end of the intake manifold 68 which is reduced in diameter opposite the jet to form a Venturi construction.

Upon the suction stroke of each charging piston 52 the suction produced in the corresponding cylinder will draw air through the carbureter 65 and the rush of air through the Venturi end of the pipe 65 will draw gasoline from the jet pipe which will mix with the air thus forming a combustible mixture and this combustible mixture passes into the manifold 66 and from there is distributed through the various pipes 64 to the different charging cylinders.

A suitable valve is provided in each inlet pipe 64 which will be opened automatically during the suction stroke of the charging piston and will be closed during the compression stroke. It will be understood, of course, that the valve 56 will be closed during the suction stroke of the charging piston (which is also the power stroke of the power piston) and will be opened during the compression stroke of the charging cylinder 52 (which is also the return stroke of the power piston 7). The valve which thus controls the supply of fuel to the charging cylinder is indicated generally at 74 and it is similar in construction to the valve 56. The valve 74 is shown in section in Fig. 6 and it comprises an open-ended cylindrical casing 75 having two ports 76, 77, one communicating with the pipe 64 and the other with the cylinder 50.

Slidably mounted in the casing 75 is a valve plug 78 which is provided with a transverse port 79 adapted to be moved into register with the ports 76, 77 thereby opening the valve 74, or to be moved out of register with said ports thereby closing the valve.

The means for operating the inlet valve 56 for the power cylinder is shown best in Figs. 4 and 5. The valve plug 58 has a stem 80 which is pivotally connected at one end to a lever 81 that in turn is pivoted at 82 to the cylinder 6. The other end of said lever is pivotally connected to a sliding rod 83 that is adapted to slide back and forth in bearings 84 carried by the cylinder. This rod is acted on by a pulling spring 85 which tends normally to hold it in the position shown in Fig. 4 and through the lever 81 to hold the valve plug 58 in its closed position with its port 63 out of register with the ports 59, 60. The spring 85 is shown as connected at one end to one of the bearings 84 and at the other end to a pin 86 on the rod 83. The rod 83 is provided with two projections 87, 88 which limit its movement relative to the cylinder.

The inlet valve 56 to the power cylinder is thus normally held closed by the spring 85 but means are provided for opening it during the return stroke of the power piston 7. For this purpose the head 10 has extending therefrom a push rod 89 which is guided in a suitable bearing 90 extending between the cylinders 6 and 50. This push rod has a push pawl 91 slidable transversely therethrough, said pawl being acted on by a spring 92 which normally tends to hold it in its lowered position shown in Fig. 5. This pawl has a head 93 which by its engagement with the push rod 89 limits the spring-pressed movement of the pawl.

The rod 83 carries a roll or projection 94 which is engaged by the projection 91 during the forward movement of the piston as shown in Fig. 5, such engagement pushing the rod 83 forwardly as far as the stop pin 88 will permit and by such forward movement operating through the lever 81 to open the valve 56.

Fig. 4 shows the parts in the position they occupy at the end of the forward stroke of the piston and at the time of the ignition of the charge, the inlet valve at this time being closed. During the backward movement of the piston and the head 10 the pawl 91 will wipe over the projection or roll 94 (the pawl 91 being provided with a bevelled face 95 to permit this) and the spring 85 will still hold the valve 56 closed. The dotted line position Fig. 4 shows the position of the pawl 91 and head 10 at the end of the power stroke. During the forward movement of the piston 7 and head 10 the straight face of the pawl 91 will engage the roll 94 after the exhaust valves have been closed, and during the continued forward movement of the power piston and head 10 the pawl 91 will move the bar 83 forwardly against the action of the spring 85 thereby opening the valve 56.

It will be remembered that during the power stroke a charge of combustible fluid has been drawn into the charging cylinder through the valve 74, which valve is closed during the forward or compressing stroke of the piston 52. As soon as the valve 56 is opened the fuel charge, which has been compressed more or less by the forward stroke of the charging piston 52, will be forced into the power cylinder through the valve 56 as soon as said valve is opened, both exhaust valves at this time being closed.

Just before the completion of the return stroke and before ignition occurs the pawl 91 is released from the roll 94 thus allowing the spring 85 to close the inlet valve 56, said valve remaining closed during the next power stroke and until it is again opened during the succeeding return stroke of the piston 7. For thus releasing the pawl 91 the head 93 of the pawl is shown as provided with two arms or projections 96 which are adapted to engage two cam members 97 formed on the cylinders 6 and 50 respectively. These cam members are arranged with inclined cam faces so that as the power piston completes its return stroke the projections 96 will ride up the inclined faces of the cams 97 as shown in Fig. 4 and thus raise the pawl out of engagement with the roll 94. As soon as the pawl is released from the roll the spring 85 will return the bar 83 to the position shown in Fig. 4 thus closing the valve 56.

The means for operating the valve 74 by which the full charges are admitted to the charging cylinder is shown at the lower left hand portion of Fig. 1 in connection with the cylinder 6b. It will be remembered that the valve 74 is opened during the back or suction stroke of the charging piston 52 and that at the end of the suction stroke the valve 74 is closed and remains closed during the forward or compressing stroke by which the charge is forced into the power cylinder.

The valve has a stem 98 to which is secured a rod 99 slidably mounted in bearings 100 carried by the cylinder 50. This rod is acted on by a pulling spring 101 which normally tends to open the valve as shown in Fig. 8, this being the position of the parts during the suction stroke. At the end of the suction stroke the valve is closed and latched in its closed relation against the action of the spring 101 as follows.

The extension 54 of the head 10 has rigid therewith a push bar 102 which is slidably mounted in bearings 103 carried by the cylinder 50. This push bar has slidably mounted thereon a collar 104 to which is pivoted one end of a lever 105, said lever being pivoted at 106 to the cylinder 50 and having its other end pivotally connected to the bar 99. The push bar 102 is provided with a pin or projection 107 near its end and situated so that just before the end of the suction stroke this projection 107 engages the collar 104 and swings the lever 105 into the position shown in Fig. 9 thereby shifting the valve 74 and moving its port 79 out of alignment with the ports 76, 77. When the valve is thus closed it is automatically latched in its closed relation by means of a spring latch 108 which is adapted to snap behind the end of a stem 98 as shown in Fig. 9.

During the forward or compressing stroke of the charging piston 52 the latch 108 will retain the valve 74 closed. Just as the piston reaches the forward end of its stroke the latch is automatically released thereby to allow the valve to be opened by the spring 101 as soon as the piston starts on its next suction stroke. For this purpose the push bar 103 is provided at its end with a projection 109 which is arranged to engage the pawl 108 just before the piston completes its forward stroke and thereby force the pawl backwardly and release it from the stem 98 as shown in Fig. 1.

The arrangement is such that just as soon as the latch is released the stem 98 the valve moves backwardly slightly until it meets the end of the push bar 103 as shown in Fig. 1. In this position the stem 98 holds the latch 108 in its inoperative position and hence as soon as the piston starts its backward movement the spring 101 will be operative to open the valve 74.

Each cylinder carries a spark plug 110 which is fired at the appropriate time to ignite the fuel charge. The timing of the ignition is controlled by the movement of the power pistons. Each spark plug is connected by a wire connection 111 with a contact member 112 carried by a suitable insulating support 113 secured to the corresponding power cylinder. Each support carries a second contact 114, the two contacts being insulated from each other by the support 113. Each contact 114 is connected by a wire connection to a ring 116 that is mounted on the hub 117 of the rotor but is insulated therefrom. This ring has continuous engagement with a contact member 118 carried by the frame 1 but insulated therefrom. Said contact member 118 is connected by a wire connection 119 to a battery or other source of electrical energy 120.

The ignition circuit for each cylinder thus includes the two insulated contacts 112, 113. The projection 45 on each rod 43 by which the exhaust valve 29 is operated carries at its end a contact member 121 which is insulated from the projection 45 and is situated to wipe over and engage the two contacts 112, 113 as the piston completes its forward movement. When the contact member 121 does thus engage both contacts 112, 113 the ignition circuit will be closed and this occurs just at the end of the return stroke of the power piston.

Each power unit comprising a power cylinder, its ignition system, and the charging cylinder, is independent from the other power units and the time of ignition of each power cylinder is independent of that of any other. Therefore, each power unit functions independently from any other power unit and the power units do not necessarily operate synchronously.

I claim:

1. In a rotary internal combustion engine, the combination with two members adapted to have a relative rotary movement, one of said members having ratchet teeth, a power cylinder carried by the other member, a piston reciprocable in said cylinder, a piston rod secured to the piston and extending beyond the cylinder, pawls carried by the portion of the piston rod which is located beyond the cylinder, a spring acting on the piston to give the return stroke thereto, means actuated by the final movement of the piston during the return stroke to cause the pawls to engage said ratchet teeth, means to introduce fuel charge into the power cylinder and ignite said charge, whereby the relative movement between the piston and cylinder produces a relative rotary movement between said two members.

2. In a rotary internal combustion engine, the combination with a stationary member having closely-arranged ratchet teeth, of a rotor, a power cylinder carried by the rotor, a piston reciprocating therein, a spring for giving the piston its return movement relative to the cylinder, means to introduce fuel charges into the power cylinder and ignite them, a pawl carried by the piston, means operated by the final return movement of the piston during the return stroke to cause the pawl to engage the ratchet teeth, whereby the rotor is driven forwardly, and an exhaust valve separate from the piston which is opened by the relative movement of the piston and cylinder at the end of the power stroke.

3. In a rotary internal combustion engine, the combination with a stationary member, of a rotor, a power cylinder carried thereby, a piston in said cylinder, a spring for giving the piston its return movement relative to the cylinder, means operated by the final return movement of the piston during its return stroke to lock the piston to the stationary member, a charging cylinder carried by the rotor, a charging piston therein connected to the power piston, a valve controlling communication between the charging cylinder and the power cylinder, means for delivering a fuel charge to said charging cylinder as its piston moves relative thereto during the power stroke, and means for closing said valve during the power stroke and opening it during the return stroke, whereby the fuel charge is transferred from the charging cylinder to the power cylinder.

4. In a rotary internal combustion engine, the combination with a stationary member, of a rotor, a power cylinder carried thereby, a piston in said cylinder, a spring for giving the piston its return movement relative to its cylinder, means operated by the final return movement of the piston during its return stroke to lock the piston to the stationary member, a charging cylinder also carried by the rotor, a charging piston therein connected to the power piston, a valve controlling communication between the charging cylinder and the power cylinder, means for delivering a fuel charge to said charging cylinder as its piston moves relative thereto during the power stroke, means for closing said valve during the power stroke and opening it during the return stroke of the piston relative to its cylinder, whereby the fuel charge is transferred from the charging cylinder to the power cylinder, and means rendered operative by the return stroke of the power piston relative to its cylinder to ignite the fuel charge.

5. In a rotary internal combustion engine, the combination with a stationary member having an annular series of ratchet teeth, of a rotor, a plurality of circumferentially-arranged power cylinders carried by the rotor, a power piston in each cylinder, a spring for giving each piston its return movement relative to its cylinder, a charging cylinder for each power cylinder, each power piston having a piston rod extending beyond the cylinder, a head on the extended end of each rod, pawls carried by each head, means operated by the movement of the piston as it completes its return stroke to move the pawls for said piston into operative engagement with the ratchet teeth relative to its cylinder, a piston in each charging cylinder connected to the corresponding head, a carburetor common to all the charging cylinders, means operative during the power stroke of each power piston to draw a fuel charge from the carbureter into the corresponding charging cylinder and during the return stroke of the piston relative to its cylinder to transfer said charge to the power cylinder.

6. In a rotary internal combustion engine, the combination with a stationary member having an annular series of ratchet teeth, of a rotor, a plurality of circumferentially-arranged power cylinders carried by the rotor, a power piston in each cylinder arranged to reciprocate axially thereof, a spring to return each piston to its starting position after its power stroke, a charging cylinder for each power cylinder, each power piston having a piston rod extending beyond its cylinder, a head on the end of each rod, a piston in each charging cylinder connected to the corresponding head, pawls carried by each head, means to move the pawls for any piston into operative engagement with the ratchet teeth when the piston reaches starting position, a carbureter common to all the charging cylinders, means operative during the power stroke of each power piston to draw a fuel charge from the carbureter into the corresponding charging cylinder and during the return of the piston to starting position to transfer said charge to the power cylinder, and ignition means rendered operative by the return movement of the piston.

7. In a rotary internal combustion engine, the combination with a stationary member, of a rotor, a plurality of circumferentially-arranged power cylinders carried by the rotor, a power piston in each cylinder, a spring for giving each piston its return movement relative to its cylinder, a charging cylinder for each power cylinder, a piston in each charging cylinder connected to the piston of the corresponding power cylinder, means to lock each power piston to the stationary member by the return movement of said piston preparatory to the power stroke and regardless of the relative position of the rotor, means to draw fuel charge into each charging cylinder during the power stroke of the corresponding power cylinder and to deliver said charge to the power cylinder during the return stroke of the piston relative to its cylinder, and means actuated by each power piston at the end of its return stroke to ignite the fuel charge.

8. In a rotary internal combustion engine, the combination with a stationary member, of a rotor, a plurality of circumferentially-arranged power cylinders carried by the rotor, a power piston in each cylinder, a spring for giving each piston its return movement relative to its cylinder, a charging cylinder for each power cylinder, each charging cylinder being arranged parallel to the corresponding power cylinder but being spaced therefrom, a piston in each charging cylinder connected to the piston of the corresponding power cylinder, means to lock each power piston to the stationary member during the power stroke, each power cylinder having an inlet valve, means to open each inlet valve during the power stroke of the corresponding power piston, whereby the movement of the corresponding charging piston will draw a charge of fuel into the corresponding charging cylinder, a valve controlling communication between each charging cylinder and each power cylinder, and means to open said valve and to close the inlet valve for the charging cylinder during the return stroke, whereby each charge is forced from the charging cylinder into the power cylinder.

In testimony whereof, I have signed my name to this specification.

MICHAEL J. CUNNINGHAM.